(12) United States Patent
Funk et al.

(10) Patent No.: US 8,448,466 B2
(45) Date of Patent: May 28, 2013

(54) PROCESS AND PLANT FOR THE TREATMENT OF THE GLASS SHEETS OF AN ASYMMETRIC GLASS-SHEET PAIR

(75) Inventors: Dieter Funk, Witten (DE); Joachim Pilz, Oer-Erkenschwick (DE); Peter Michels, Sprockhovel (DE)

(73) Assignee: Pilkington Automotive Deutschland GmbH, Witten (DE)

( * ) Notice: Subject to any disclaimer, the term of this patent is extended or adjusted under 35 U.S.C. 154(b) by 765 days.

(21) Appl. No.: 10/551,284

(22) PCT Filed: Mar. 22, 2004

(86) PCT No.: PCT/EP2004/002980
§ 371 (c)(1),
(2), (4) Date: Jul. 27, 2006

(87) PCT Pub. No.: WO2004/085324
PCT Pub. Date: Oct. 7, 2004

(65) Prior Publication Data
US 2006/0260359 A1    Nov. 23, 2006

(30) Foreign Application Priority Data
Mar. 28, 2003 (DE) .................................. 103 14 400

(51) Int. Cl.
*C03B 23/023* (2006.01)
*C03B 23/03* (2006.01)

(52) U.S. Cl.
CPC ........... *C03B 23/023* (2013.01); *C03B 23/0307* (2013.01)
USPC .............................. 65/29.19; 65/106; 65/162

(58) Field of Classification Search
CPC .................................................... C03B 23/023
USPC ............ 65/29.12, 29.19, 106, 376, 385, 29.1, 65/160, 162
See application file for complete search history.

(56) References Cited

U.S. PATENT DOCUMENTS

| | | | | |
|---|---|---|---|---|
| 2,985,986 | A | * | 5/1961 | Leflet, Jr. .......................... 65/62 |
| 4,043,782 | A | * | 8/1977 | Bamford et al. ................ 65/104 |

(Continued)

FOREIGN PATENT DOCUMENTS

| EP | 0 398 759 | 11/1990 |
|---|---|---|
| EP | 0 398 759 A2 | 11/1990 |

(Continued)

OTHER PUBLICATIONS

U.S. Appl. No. 10/551,286, Quenzer et al.

(Continued)

*Primary Examiner* — Christina Johnson
*Assistant Examiner* — Cynthia Szewczyk
(74) *Attorney, Agent, or Firm* — Buchanan Ingersoll & Rooney PC

(57) ABSTRACT

The glass sheets (2) of an asymmetric glass-sheet pair, which is intended for the production of laminated glass, are preheated in a preheating furnace (1) and then undergo a press-bending process in a press-bending station (4). By means of a temperature measuring point (11) arranged at the exit of the press-bending station, it is ensured that the glass sheets exhibit a uniform bending behavior, in order to guarantee identical restoring forces during cooling. The temperature measuring point (11) is connected to a control device (16), which causes an intermediate cooling of the glass sheet heating more rapidly by means of an intermediate cooling installation (12, 13) in the pre-heating furnace and/or lengthens its dwell time in the press-bending station (4) by means of a timing control element (15).

14 Claims, 3 Drawing Sheets

U.S. PATENT DOCUMENTS

Figure 1:
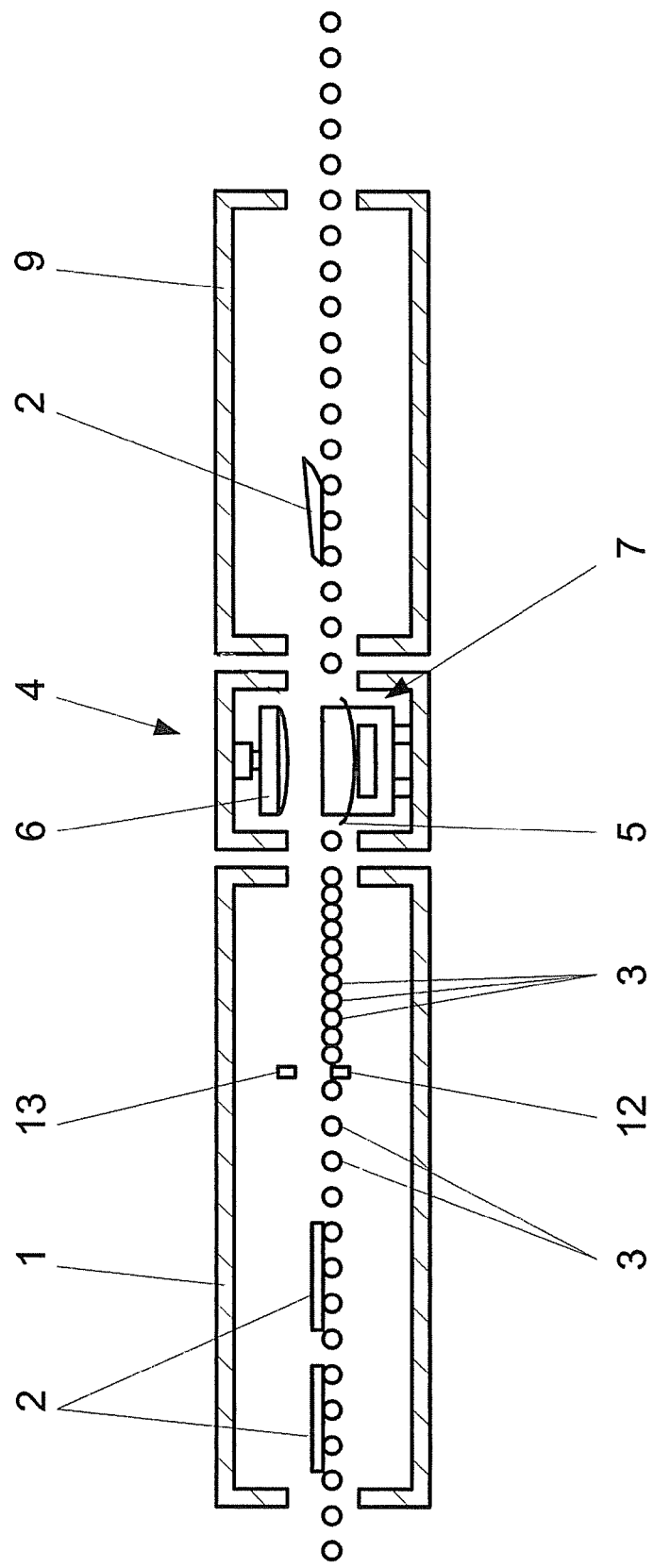

| | | | | |
|---|---|---|---|---|
| 4,065,284 | A | * | 12/1977 | Mang et al. ............... 65/114 |
| 4,311,503 | A | * | 1/1982 | Kellar et al. ............... 65/29.1 |
| 4,738,704 | A | * | 4/1988 | Vanaschen et al. ......... 65/106 |
| 4,746,348 | A | | 5/1988 | Frank |
| 4,828,598 | A | * | 5/1989 | Imamura et al. ............. 65/104 |
| 4,952,227 | A | | 8/1990 | Herrington et al. |
| 5,330,549 | A | | 7/1994 | Carlomagno et al. |
| 5,336,288 | A | | 8/1994 | Carlomagno et al. |
| 5,376,158 | A | | 12/1994 | Shetterly et al. |
| 5,755,845 | A | * | 5/1998 | Woodward et al. ............. 65/102 |
| 5,833,729 | A | | 11/1998 | Meunier et al. |
| 5,857,358 | A | | 1/1999 | De Vries, Jr. et al. |
| 5,938,810 | A | * | 8/1999 | De Vries et al. ............. 65/268 |
| 6,227,008 | B1 | | 5/2001 | Shetterly et al. |
| 6,321,570 | B1 | * | 11/2001 | De Vries et al. ............. 65/104 |
| 2004/0079112 | A1 | * | 4/2004 | Inoue et al. ............. 65/29.11 |
| 2005/0061034 | A1 | | 3/2005 | Boisselle et al. |

FOREIGN PATENT DOCUMENTS

| | | |
|---|---|---|
| EP | 0 523 016 A2 | 1/1993 |
| EP | 0 523 016 B1 | 1/1993 |
| EP | 0 530 211 B1 | 3/1993 |
| EP | 0 578 542 A1 | 1/1994 |
| EP | 0 578 542 B1 | 1/1994 |
| EP | 0 593 137 B1 | 4/1994 |
| EP | 0 593 138 B1 | 4/1994 |
| JP | 02-30632 A | 2/1990 |
| JP | 2000-247663 | 9/2000 |

OTHER PUBLICATIONS

Notification of Reasons for Refusal dated Oct. 6, 2009 issued in the corresponding Japanese Patent Application No. 2006-504785 and English Translation.

* cited by examiner

PROCESS AND PLANT FOR THE TREATMENT OF THE GLASS SHEETS OF AN ASYMMETRIC GLASS-SHEET PAIR

The invention relates to a process and a plant for the treatment of the glass sheets of an asymmetric glass-sheet pair for the production of laminated glass, whereby the glass sheets are preheated, then undergo a press-bending process and are finally cooled.

Laminated glass has diverse applications, in particular as laminated safety glass for windows used in motor vehicle construction. Windscreens on present-day motor vehicles may thus consist of two glass sheets or plies, which are preheated, bent separately from one another and after cooling are joined together with the interposition of a plastic film serving as an interlayer.

The individual plies of glass making up a windscreen may be of identical thickness, colour, surface emissivity, etc, in which case they (and the resulting windscreen) are referred to as "symmetric". If the plies differ in one or more of these respects, they are referred to as "asymmetric".

As a rule, the individual plies of a pair of glass sheets advance through the preheating furnace directly one behind the other, so that they are thus subjected to virtually identical heating conditions. With symmetric pairs of glass sheets, in which case the two glass sheets exhibit identical heating and heat-absorption properties, this guarantees a very uniform bending behaviour.

The circumstances are different with asymmetric pairs of glass sheets, in which case the two glass sheets exhibit different heating and heat-absorption properties. Thickness differences, colour differences or different glass compositions, for example, come into consideration as reasons for different heating and heat-absorption properties. Thus, thinner glass sheets, or sheets absorbing heat more intensely, heat up more rapidly than thicker glass sheets, or sheets absorbing less heat or reflecting heat, and therefore reach higher temperatures more rapidly under identical heating conditions.

In order to take account of these differences, it is known from EP 0 593 137 B1 to heat with less intensity the glass sheet of each glass-sheet pair heating more rapidly, for example by interposing screening elements or by increasing the distance between the glass sheet and the heating elements. As an alternative to this, EP 0 593 138 B1 describes a process in which the glass sheet heating more slowly of each glass-sheet pair is separately preheated before entry into the preheating stage. Both measures are intended to render the bending temperature of the two glass sheets uniform, i.e. the temperature upon entry into the bending station, so that they are subjected to the press-bending process at the same temperature, in order in this way to achieve bending procedures that correspond very precisely.

It has been found that the bending accuracy can still be improved, and the problem underlying the invention, therefore, is to achieve such an improvement.

To solve this problem, the process mentioned at the outset is characterised according to the invention in that the preheating and/or the press-bending process are controlled in such a way that the glass sheets are at substantially the same temperature after completion of the press-bending process.

It is to be understood that slight temperature differences will not be totally eliminated in practice. Substantially the same temperature therefore means, within the scope of the invention, deviations of the measured sheet temperatures of not more than approximately 3 to 5° C.

The invention is based on the knowledge that it is not the bending temperature, i.e. the temperature of the glass sheets upon entry into the press-bending station, but the bending behaviour of the glass sheets, determined amongst other things by the different heat-absorption capacity of the individual glass sheets, that is of decisive importance, since it determines the residual elasticity of the glass. The residual elasticity of the glass sheets determines the extent to which the shape of the bent sheets is changed again by elastic restoration after the end of the bending process. Differences in the bending behaviour of the two glass sheets therefore influence the respective restoring forces during cooling and can accordingly cause the cooled glass sheets to deviate to a differing extent from the original bending shape, as a result of which the bending accuracy is adversely affected. When one individual glass sheet of such a pair is superposed on the other for lamination (if this is still at all possible), undesired stresses in the glass sheets and considerable deviations from the nominal shape can thus be caused, leading to breakage or eventual delamination.

According to the invention, therefore, the bending behaviour of at least one of the two glass sheets is adapted to that of the other, and surprisingly it has been found that identical bending behaviour can be achieved if it is ensured by control technology that the two glass sheets have the same temperature not before, but after passing through the press-bending process. Preferably this is achieved by cooling the hotter sheet. The difference in the heat amount between the two glass sheets can in this way be compensated for, so that identical residual elasticities and thus identical restoring forces arise during cooling after bending. An impressive bending accuracy can thus be achieved.

According to the invention, it is possible not only to reduce almost to zero the difference in the heat amount between glass sheets following one another in the preheating of an asymmetric glass-sheet pair, but also to keep the bending behaviour of different batches virtually constant. Different ambient conditions, for example between summer and winter, are thus compensated for.

The invention creates the prerequisite permitting bent laminated safety glass of the highest precision to be produced. CAD data can be copied exactly. This is important above all for modern car construction. This is because here it is not only the demands on the shape tolerances of the glass sheets and their optical quality that are becoming increasingly strict, but there is also an increasing tendency to display information on the windscreen (head-up displays). This can be achieved free from distortion only if the image area complies with prescribed dimensions precisely and true to contour.

In a development of the invention, it is proposed that the temperature of the glass sheets be recorded as a control parameter before the start and/or after completion of the press-bending process. Since the temperature after completion of the press-bending process is decisive within the scope of the invention, a temperature measurement following the press-bending station proves to be the preferred option. Since, however, the temperature changes of glass sheets of a certain sheet type during the press-bending process are known or can be determined by preliminary tests, it is also possible as an alternative to measure the temperature before the start of the press-bending process and to calculate therefrom, to a good approximation, the temperature after completion of the press-bending process that is used as a control parameter within the scope of the invention. Determination of control conditions from dual inputs, thereby increasing the process reliability, are obtained by recording both temperatures.

As a first control alternative, the invention proposes that the glass sheet heating more rapidly be subjected to the press-bending process for a longer period than the glass sheet heating more slowly. As an alternative to or in addition to this, there is the possibility in a development of the invention for the glass sheet heating more rapidly to undergo intermediate cooling during or immediately after the preheating, preferably to below the transformation point. The heating conditions during the preheating are therefore kept constant in both cases for the two glass sheets, whereby the extent of the intermediate cooling can be adapted precisely to the relaxation and residual heating that still takes place on the remaining path through the preheating stage. A very accurate control of the bending behaviour is the result.

The intermediate cooling preferably is carried out by blowing air at ambient temperature at both sides of the glass sheet, whereby the air is blown in particular with a blowing pressure of <200 mbar.

The plant according to the invention for the treatment of the glass sheets of an asymmetric pair of glass sheets for the production of laminated glass has a preheating furnace followed by a press-bending station as well as a lehr downstream of the press-bending station. The press-bending station can be integrated into the preheating furnace or be downstream of the latter as a separate installation.

The plant according to the invention is characterised by a control device for controlling the preheating furnace and/or the press-bending station and by at least a first temperature measuring point for the glass sheets, arranged between the press-bending station and the lehr, said temperature measuring point being coupled with the control device, whereby the signal from the temperature measuring point is used directly or indirectly for controlling the preheating furnace and/or the press-bending station.

In the simplest case, this first temperature measuring point is directly connected to the control device, so that the temperature measured at the exit of the press-bending station is used directly to control the preheating and/or the bending process.

According to a development of the invention, there is provided before the press-bending station a further temperature measuring point, the signal from which is fed to the control device and is used as an indirect measure of the temperature of the glass sheets at the exit of the press-bending station for controlling the preheating furnace and/or the press-bending station.

The temperature measured before the press-bending station can be fed to the control device as an additional control or check parameter to improve the control accuracy. It is also possible, however, to transmit to the control device the temperature measured by the further temperature measuring point arranged before the press-bending station and to use it directly for controlling the preheating and/or bending process. This assumes, within the scope of the invention, that a sheet-pair-specific relationship between the temperatures that are measured by the temperature measuring points arranged before and after the press-bending station is previously determined and made available to the control device. It is to be understood that, for a high control accuracy, any further temperature measuring point provided before the press-bending station should be arranged as close as possible to the latter, i.e. preferably between the preheating furnace and the press-bending station in the case of a press-bending station located outside the preheating furnace.

In a development of the invention, this plant is characterised by an intermediate cooling installation arranged in the preheating furnace, whereby the control device causes the intermediate cooling installation to act solely on the glass sheet heating more rapidly.

A further advantageous feature consists in the fact that the intermediate cooling installation is designed as a stationary air-cooling installation and has at least one pair of jet tubes, which are aligned at right angles to the transport direction of the glass sheets and, lying opposite one another, act on the upper and lower side of the glass sheet heating more rapidly. This is a simple, but effective and very reliable design.

It is further proposed that the preheating furnace be designed as a roller-hearth furnace, whereby the spacing between the transport rollers diminishes towards the exit, and that the pair of jet tubes, or in the case of several pairs of jet tubes the pair of jet tubes lying nearest to the exit, is arranged where the lower jet tube just fits between two neighbouring transport rollers. The reduction in the spacing between the transport rollers towards the exit results from the fact that the glass sheets soften with increasing temperature and accordingly require more support towards the end of the preheating furnace. It has been found that a sufficient spacing between the intermediate cooling installation and the exit of the preheating furnace can reliably guarantee the reheating of the glass sheet subjected to intermediate cooling to a degree required for the uniformity of the bending behaviour aimed at according to the invention.

As an alternative to or in addition to this, the control device can include a timing control element, with which the dwell time of the glass sheets in the press-bending station is set according to the temperature of the sheets at the exit of the press-bending station determined by the temperature measuring point(s).

Advantageous and preferred developments of the invention are characterised in the sub-claims.

Figure 2:
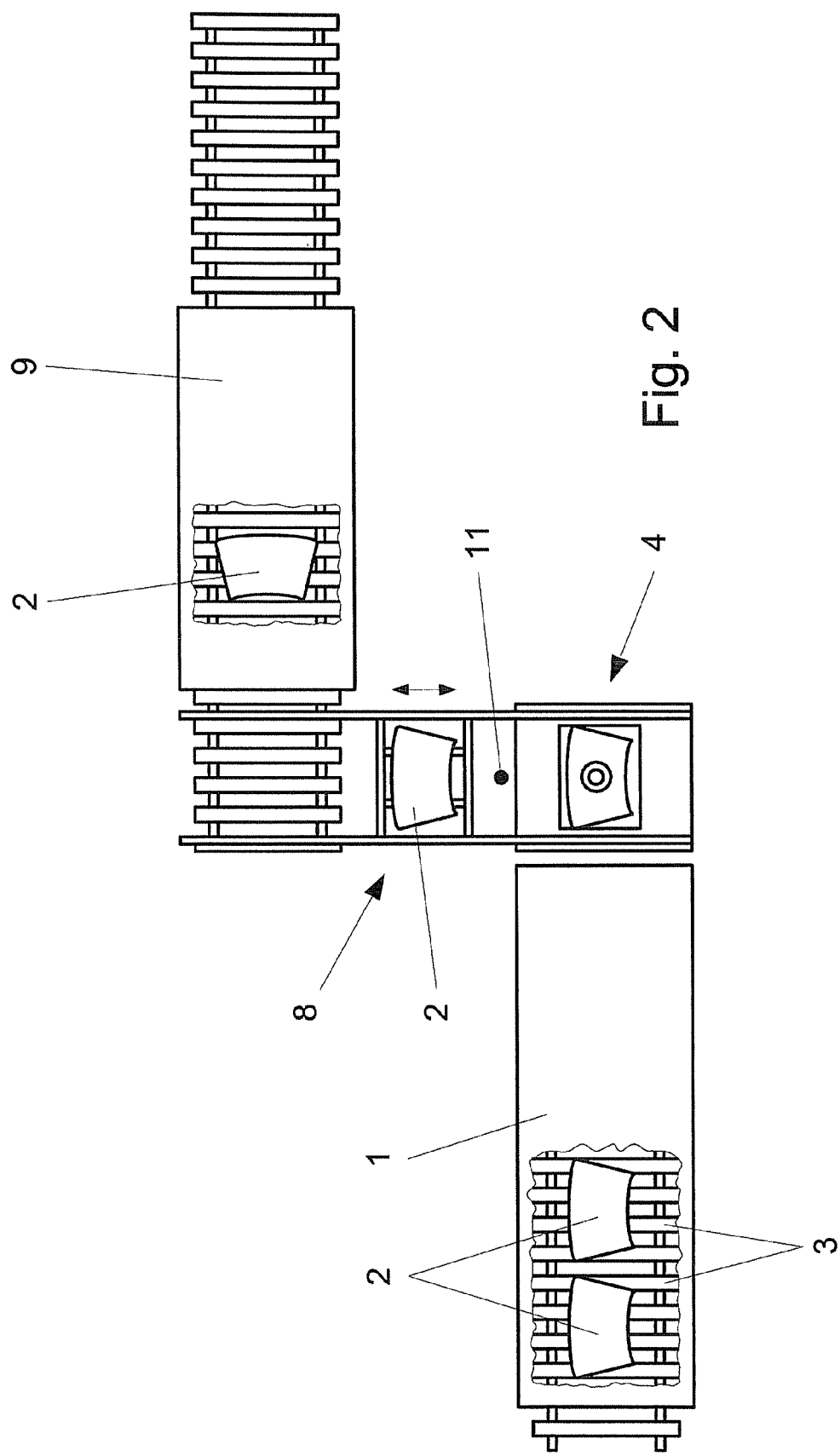
Figure 3:
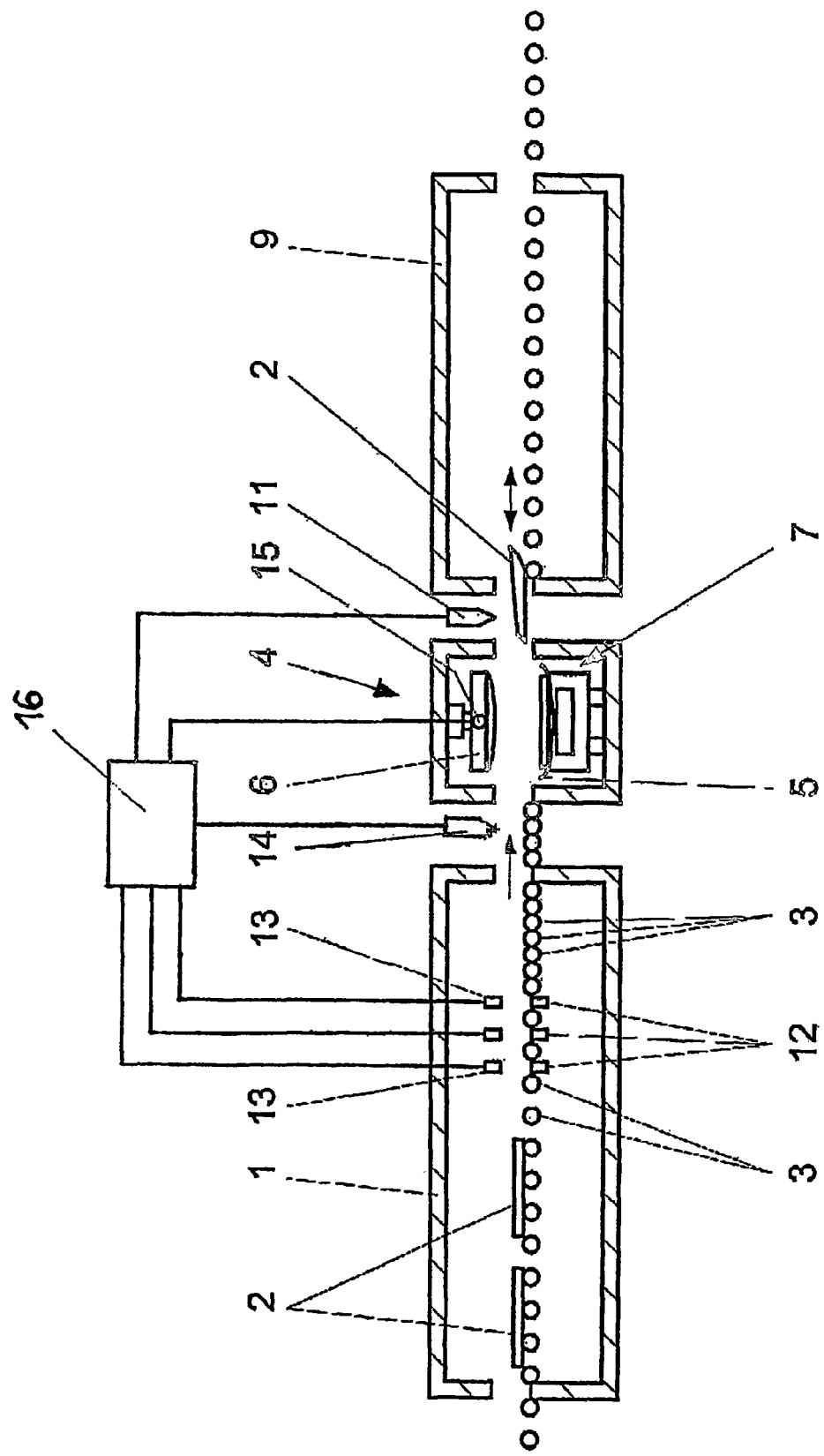

The invention is explained in greater detail below with the aid of preferred examples of embodiment in connection with the appended drawings. The drawings show the following:

FIG. 1 a vertical section through a plant according to the invention;

FIG. 2 a plan view of the plant according to FIG. 1;

FIG. 3 a modified form of embodiment of the plant in a representation according to FIG. 1.

The plant according to FIGS. 1 and 2 has a preheating furnace 1, which serves to preheat glass sheets 2 of a glass-sheet pair. Glass sheets 2 advance through the furnace on rollers 3, the spacing of which is reduced in the area of the furnace exit, since heated glass sheets 2 are deformable and therefore require a more intensive support.

Preheating furnace 1 is followed by a press-bending station 4, which in the example shown is provided with a glass-bending mould 5 in the form of a ring conforming in outline and elevation to the desired shape of the glass sheet, and a vacuum full surface contact mould 6. Press-bending station 4 could also be arranged inside preheating furnace 1 at its end. Ring mould 5 surrounds a chamber 7, which serves to build up a gas cushion. Glass sheets 2 transfer onto this gas cushion as soon as they leave preheating furnace 1. Chamber 7 then descends and places respective glass sheet 2 onto ring mould 5. At the same time, the vacuum mould is conveyed downwards in order to engage respective glass sheet 2 by suction and to bring it into the desired shape.

A transport device 8, e.g. a roller conveyor (FIG. 2), serves to transfer bent glass sheets 2 into a lehr 9.

Furthermore, FIG. 2 shows a first temperature measuring point 11 arranged directly at the exit of press-bending station 4, said temperature measuring point detecting the temperature of glass sheets 2 as a control parameter after completion of the press-bending process. The reason for this is that, according to the invention, the two glass sheets 2 of the asymmetric glass-sheet pair should be at the same temperature after completion of the press-bending process, since this is the prerequisite for glass sheets 2 displaying identical bending behaviour. The restoring forces of the two glass sheets 2 are in this way adapted to one another and the bending accuracy is thus increased.

First temperature measuring point 11 is connected to a control device 16 shown diagrammatically in FIG. 3, which for its part acts, in dependence on the measured temperature, on the intermediate cooling installation which is arranged in preheating furnace 1. The intermediate cooling installation has a pair of opposed jet tubes comprising lower jet tube 12 and upper jet tube 13. The jet tubes are supplied with air at ambient temperature, and preferably at a blowing pressure of <200 mbar in order to avoid abrupt cooling. The two jet tubes 12 and 13 are arranged at a position towards the downstream end of the furnace where the roller spacing is still sufficiently great for the lower jet tube 12 to fit between two neighbouring rollers 3, preferably at the furthest downstream position where this is the case. Typically, the jet tubes have a diameter of approximately 40 mm to 60 mm.

Control device 16 causes jet tubes 12 and 13 only to act on the glass sheet 2 which heats more rapidly. The intermediate cooling in combination with the subsequent reheating and temperature relaxation on the remaining path through preheating furnace 1 permits a very precise temperature control.

In the form of embodiment according to FIG. 3, three jet-tube pairs 12, 13 are provided, which are able as required to intensify the intermediate cooling and furthermore are suitable for increasing the precision of the control. It is also possible to provide one or more pairs of jet tubes immediately after the furnace, cooling the hotter sheet before it is bent.

Furthermore, there is also arranged at the entry of press-bending station a further temperature measuring point 14, which detects the bending temperature. As already explained at the outset, it is not the bending temperature, but the bending behaviour that is of importance according to the invention. For the latter, the temperature at the exit of press-bending station 4 is decisive, which can be detected as a control parameter via first temperature measuring point 11 at the exit of press-bending station 4.

The bending temperatures of different glass sheets 2 before entry into press-bending station 4 are as a rule different from one another within the scope of the process according to the invention. Since the cooling conditions for a glass sheet 2 of a certain sheet type in press-bending station 4 are known or can be determined by preliminary tests, the bending temperatures (at the entry of press-bending station 4) of individual glass sheets 2 required for identical temperatures of a glass-sheet pair at the exit of press-bending station 4 can be calculated or determined. In this way, control of preheating furnace 1 and/or press-bending station 4 is also possible with the aid of the further temperature measuring point 14, whereby the temperature measured by the latter is thus used as an indirect measure of the temperature of glass sheets 2 at the exit of press-bending station 4.

In the form of embodiment according to FIG. 3, provision is made such that control device 16 also acts via a timing control element 15 on the dwell time of glass sheets 2 in press-bending station 4. This is a measure with which the bending behaviour can be influenced additionally or alternatively. If need be, it is possible with this variant to dispense with the use of an intermediate cooling installation (et tubes 12 and 13) or other means influencing the temperature of glass sheets 2 before entry into press-bending station 4 in order to achieve the aim according to the invention of identical temperatures of glass sheets 2 at the exit of press-bending station 4.

The invention claimed is:

1. A process for the treatment of the glass sheets of an asymmetric pair of glass sheets for the production of a laminated window, whereby the individual glass sheets are preheated to different temperatures, then undergo a press-bending process, wherein the preheating and/or the press-bending process are controlled in such a way that the two glass sheets have a temperature difference of no more than approximately 5° C. immediately after completion of the press-bending process, after which the glass sheets are cooled.

2. The process according to claim 1, wherein the temperature of the glass sheets is detected as a control parameter after completion of the press-bending process.

3. The process according to claim 1, wherein the temperature of the glass sheets is detected as a control parameter before the start of the press-bending process.

4. The process according to claim 1, wherein a glass sheet heating more rapidly is subjected to the press-bending process for a longer period than a glass sheet heating more slowly.

5. The process according to claim 1, wherein the glass sheet heating more rapidly is subjected to intermediate cooling during or immediately after the preheating.

6. The process according to claim 5, wherein the intermediate cooling is carried out by blowing air at ambient temperature at both sides of the glass sheet.

7. The process according to claim 6, wherein the air is blown with a blowing pressure of <200 mbar.

8. The process according to claim 1, wherein the preheating and/or the press-bending process are controlled in such a way that the two glass sheets have a temperature difference of no more than approximately 3° C. after completion of the press-bending process.

9. A process for the treatment of the glass sheets of an asymmetric pair of glass sheets for the production of a laminated window, comprising:
   individually preheating the asymmetric glass sheets to different temperatures;
   individually press-bending the glass sheets;
   detecting the temperature of the glass sheets after press-bending the glass sheets; and
   controlling the preheating and/or the press-bending so that the glass sheets have a temperature difference of no more than approximately 5° C. immediately after press-bending the glass sheets, after which the glass sheets are cooled.

10. The process according to claim 9, wherein the press-bending of the glass sheets is performed at a press-bending station having a glass-bending mould, and wherein the detecting of the temperature of the glass sheets is performed at the exit of the press-bending station.

11. The process according to claim 9, wherein the control of the preheating and/or the press-bending is performed based on the detected temperature of the glass sheets after press-bending the glass sheets.

12. The process according to claim 9, wherein the preheating and/or the press-bending are controlled so that the glass sheets have a temperature difference of no more than approximately 3° C. after press-bending the glass sheets.

13. A process for the treatment of the glass sheets of an asymmetric pair of glass sheets for the production of a laminated window, whereby the individual glass sheets are preheated, then undergo a press-bending process, wherein the preheating and/or the press-bending process are controlled in such a way that the two glass sheets have a temperature difference of no more than approximately 5° C. immediately after completion of the press-bending process, after which the glass sheets are cooled, wherein a glass sheet heating more rapidly is subjected to the press-bending process for a longer period than a glass sheet heating more slowly.

14. The process according to claim 13, wherein the pre-heating and/or the press-bending process are controlled in such a way that the two glass sheets have a temperature difference of no more than approximately 3° C. after completion of the press-bending process.

\* \* \* \* \*